(12) United States Patent
Binzer et al.

(10) Patent No.: US 10,018,713 B2
(45) Date of Patent: Jul. 10, 2018

(54) RADAR SYSTEM FOR MOTOR VEHICLES, AND MOTOR VEHICLE HAVING A RADAR SYSTEM

(75) Inventors: Thomas Binzer, Ingersheim (DE); Christian Waldschmidt, Renningen (DE); Raphael Hellinger, Pforzheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 600 days.

(21) Appl. No.: 14/130,431

(22) PCT Filed: May 8, 2012

(86) PCT No.: PCT/EP2012/058455
§ 371 (c)(1),
(2), (4) Date: Mar. 19, 2014

(87) PCT Pub. No.: WO2013/004418
PCT Pub. Date: Jan. 10, 2013

(65) Prior Publication Data
US 2014/0191895 A1   Jul. 10, 2014

(30) Foreign Application Priority Data

Jul. 5, 2011  (DE) .................. 10 2011 078 641

(51) Int. Cl.
*G01S 13/93*   (2006.01)
*G01S 13/02*   (2006.01)
*G01S 13/87*   (2006.01)

(52) U.S. Cl.
CPC ............ *G01S 13/02* (2013.01); *G01S 13/878* (2013.01); *G01S 13/931* (2013.01);
(Continued)

(58) Field of Classification Search
CPC .................. G01S 13/93; G01S 13/931; G01S 2013/0245; G01S 2013/9314;
(Continued)

(56) References Cited

U.S. PATENT DOCUMENTS 5,008,678 A * 4/1991 Herman .................. G01S 7/032
                                                         342/158
5,463,384 A * 10/1995 Juds ........................ B60Q 9/008
                                                         340/435
(Continued)

FOREIGN PATENT DOCUMENTS

CN       101031818 A    9/2007
CN       101398479 A    4/2009
(Continued)

OTHER PUBLICATIONS

International Search Report for PCT/EP2012/058455, dated Aug. 22, 2012.

*Primary Examiner* — Peter M Bythrow
(74) *Attorney, Agent, or Firm* — Norton Rose Fulbright US LLP; Gerard Messina

(57) ABSTRACT

A radar system for motor vehicles has at least two radar sensors for emitting and receiving radar radiation for monitoring the surroundings of the motor vehicle, the at least two radar sensors being each positioned at an angle between 40 degrees and 50 degrees to an axis, and the at least two radar sensors being configured in such a way that the respective antenna has a pivotable visual range of an angle between at least −60 degrees and +60 degrees, in particular between −45 degrees and +45 degrees, relative to the main emission direction of the respective radar sensor.

10 Claims, 1 Drawing Sheet

(52) U.S. Cl.
CPC ............... *G01S 2013/9332* (2013.01); *G01S 2013/9375* (2013.01); *G01S 2013/9378* (2013.01)

(58) Field of Classification Search
CPC ..... G01S 2013/9332; G01S 2013/9375; G01S 2013/9378; G01S 2013/9389; G08G 1/16; G08G 1/167; G08G 1/168
USPC .................................................... 342/70–72
See application file for complete search history.

(56) References Cited

U.S. PATENT DOCUMENTS

| | | | | |
|---|---|---|---|---|
| 5,467,072 A | * | 11/1995 | Michael | G01S 13/931 340/436 |
| 5,712,640 A | * | 1/1998 | Andou | H01Q 1/3233 342/70 |
| 5,717,399 A | * | 2/1998 | Urabe | G01S 13/931 342/70 |
| 5,861,839 A | * | 1/1999 | Upton | G01S 3/04 342/350 |
| 5,959,552 A | * | 9/1999 | Cho | B60R 19/38 180/167 |
| 6,085,151 A | * | 7/2000 | Farmer | G01S 7/023 342/70 |
| 6,087,928 A | * | 7/2000 | Kleinberg | B60Q 9/008 340/435 |
| 6,243,015 B1 | | 6/2001 | Yeo | |
| 6,346,887 B1 | | 2/2002 | Van Orden et al. | |
| 6,577,269 B2 | * | 6/2003 | Woodington | B60K 31/0008 342/195 |
| 6,628,227 B1 | * | 9/2003 | Rao | G01S 13/931 342/70 |
| 6,708,100 B2 | * | 3/2004 | Russell | H01Q 1/3233 701/300 |
| 7,268,722 B2 | * | 9/2007 | Gottwald | G01S 13/878 342/107 |
| 7,363,194 B2 | * | 4/2008 | Schlick | B60R 21/013 340/426.25 |
| 7,369,941 B2 | * | 5/2008 | Schiffmann | G01S 13/878 340/435 |
| 7,504,986 B2 | * | 3/2009 | Brandt | G01S 13/931 340/435 |
| 8,108,147 B1 | * | 1/2012 | Blackburn | G08G 1/166 235/454 |
| 8,314,707 B2 | | 11/2012 | Kobetski et al. | |
| 8,552,848 B2 | * | 10/2013 | Rao | B60Q 9/006 340/435 |
| 9,868,352 B1 | | 1/2018 | Plummer et al. | |
| 9,873,437 B2 | | 1/2018 | Fung et al. | |
| 2002/0067314 A1 | * | 6/2002 | Takimoto | H01Q 1/3233 343/713 |
| 2003/0164791 A1 | * | 9/2003 | Shinoda | G01S 13/4463 342/70 |
| 2005/0248445 A1 | * | 11/2005 | Matsuoka | B60Q 9/008 340/435 |
| 2005/0278098 A1 | * | 12/2005 | Breed | B60R 21/0134 701/45 |
| 2006/0077052 A1 | * | 4/2006 | Matsuoka | G01S 13/56 340/471 |
| 2006/0158369 A1 | * | 7/2006 | Shinoda | G01S 7/2925 342/70 |
| 2006/0176160 A1 | * | 8/2006 | Zoratti | G01S 13/18 340/435 |
| 2007/0222662 A1 | * | 9/2007 | Toennesen | G01S 13/48 342/27 |
| 2007/0241962 A1 | * | 10/2007 | Shinoda | G01S 7/032 342/361 |
| 2007/0279199 A1 | * | 12/2007 | Danz | B60Q 9/006 340/435 |
| 2008/0030394 A1 | * | 2/2008 | Yoshida | G01S 13/931 342/74 |
| 2008/0150734 A1 | | 6/2008 | Johns | |
| 2008/0150819 A1 | * | 6/2008 | Uno | H01Q 3/24 343/770 |
| 2009/0040054 A1 | | 2/2009 | Wang et al. | |
| 2009/0189814 A1 | * | 7/2009 | Moriuchi | G01S 3/48 342/451 |
| 2009/0267822 A1 | * | 10/2009 | Shinoda | G01S 7/352 342/70 |
| 2010/0245065 A1 | * | 9/2010 | Harada | G01S 7/529 340/435 |
| 2011/0080313 A1 | * | 4/2011 | Wintermantel | G01S 7/032 342/70 |
| 2011/0095937 A1 | * | 4/2011 | Klar | G01S 7/032 342/70 |
| 2011/0163909 A1 | * | 7/2011 | Jeong | G01S 13/4463 342/70 |
| 2011/0241857 A1 | * | 10/2011 | Brandenburger | G01S 15/87 340/435 |
| 2012/0194377 A1 | * | 8/2012 | Yukumatsu | G01S 13/931 342/70 |
| 2012/0277989 A1 | * | 11/2012 | Zeller | G08G 1/16 701/301 |

FOREIGN PATENT DOCUMENTS

| | | |
|---|---|---|
| DE | 10 2004 004 491 | 8/2005 |
| DE | 102004004492 | 8/2005 |
| DE | 10 2004 028 613 | 12/2005 |
| FR | 2 821 039 | 8/2002 |
| JP | 2005-534038 | 11/2005 |
| JP | 2007-057406 | 3/2007 |
| JP | 2007-531872 | 11/2007 |
| JP | 2009-156705 | 7/2009 |
| JP | 2013-513093 | 4/2013 |
| WO | 2007085509 A1 | 8/2007 |
| WO | WO 2009/081252 | 7/2009 |
| WO | WO 2011/066993 | 6/2011 |

* cited by examiner

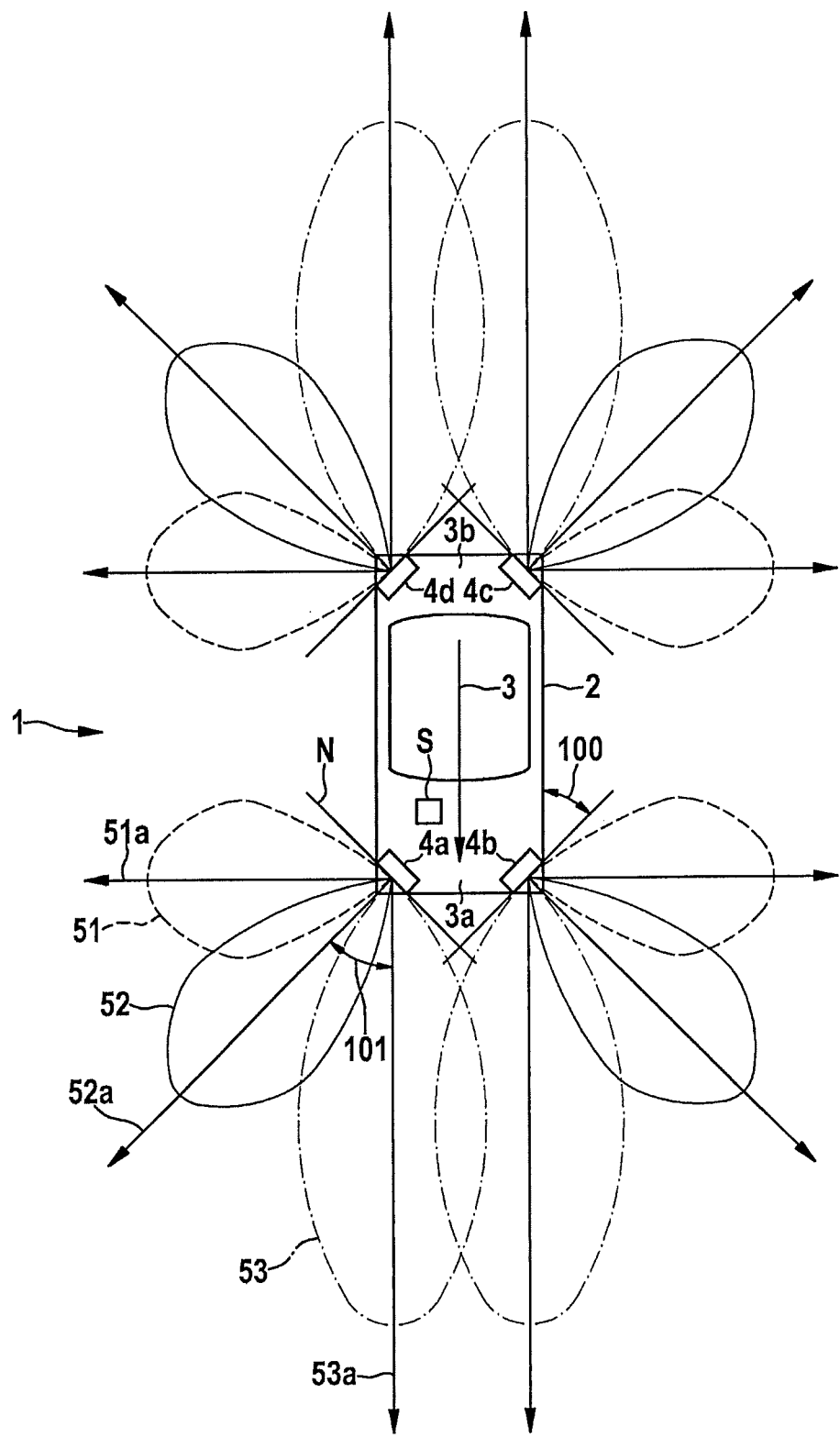

RADAR SYSTEM FOR MOTOR VEHICLES, AND MOTOR VEHICLE HAVING A RADAR SYSTEM

BACKGROUND OF THE INVENTION

1. Field of the Invention

The present invention relates to a radar system for a motor vehicle, a motor vehicle having a radar system and the use of a radar system in a motor vehicle.

2. Description of the Related Art

Radar systems in motor vehicles are frequently used to measure distances with the aid of the Doppler effect and/or the relative speeds of other motor vehicles or other objects in the traffic surroundings of the motor vehicle.

For this purpose, such radar systems also serve, in particular, to facilitate monitoring of the traffic in neighboring lanes. A radar system of this type for a motor vehicle is known, for example, from published German patent application document DE 10 2004 004 491 A1. The latter shows a radar system for a motor vehicle having at least one radar sensor, the radar sensor including a phased array antenna and a control unit for adjusting multiple radar beams of differing geometry, in order to detect traffic in a lane adjacent to the motor vehicle.

In addition, a lane change assistant for a motor vehicle is known from published German patent application document DE 10 2004 028 613 A1. The lane change assistant includes a device for determining a hazard level using location data of the motor vehicles involved in the lane change, in such a way that a detection device for ambient conditions is provided, and that the determined hazard level is also a function of the detected ambient conditions, for example, of the ambient brightness or the amount of rainfall.

In order to emit and receive radar radiation, radar sensors of this type have antennas which, in the automotive industry, are normally designed as so-called patch antennas on an HF substrate. In this design separate antennas are used for emitting a transmission signal and for receiving the reflected signal. To estimate the angle of a passing vehicle, phase differences of the received radar signals are evaluated in channels of the receiver antenna. In order to achieve a defined direction for transmission signals, individual antenna elements which have different phases may be actuated to pivot the emission direction, the antenna lobe or the visual range of the transmitter and receiver antenna in different directions. Because of the ever-increasing number of additional driver assistance systems, such as, for example, blind spot assistant, lane change assistant, or cross-traffic detection assistant, it is necessary to install many different radar sensors in the vehicle, each with different requirements with respect to accuracy, emission direction and/or receiving directions, etc. However, these require considerable space and are cost intensive.

BRIEF SUMMARY OF THE INVENTION

The present invention provides a radar system for motor vehicles having at least two radar sensors for emitting and receiving radar radiation for monitoring the surroundings of the motor vehicle, the at least two radar sensors each being arranged at an angle between 40 and 50 degrees relative to a common axis, and the at least two radar sensors each including at least one sensor, and the at least two radar sensors being configured in such a way that the respective antenna has a pivotable visual range of an angle between −60 degrees and +60 degrees, in particular between −45 degrees and +45 degrees relative to the main emission direction of the respective radar sensor.

The present invention also provides the use of a radar system in a motor vehicle for detecting a blind spot, for lane change assistance and for detecting cross-traffic and, in particular, for detecting an accident.

An advantage achieved with the present invention is that it may provide multiple driver assistance systems in a simple and cost-effective manner, for example, blind spot assistant, lane change assistant, and cross-traffic assistant, using as few radar sensors as possible.

According to one advantageous refinement of the present invention, at least two radar sensors are positioned symmetrically relative to one another. The advantage achieved by this is that monitoring of the surroundings of the motor vehicle is enabled in a particularly reliable manner with the aid of the radar system. In addition, a preferably large area of the surroundings of the motor vehicle may be monitored.

According to another advantageous refinement of the present invention, at least one of the radar sensors is configured to provide, in terms of direction, essentially simultaneously at least two different visual ranges of the at least one antenna. The advantage achieved by this is that in terms of their three-dimensional spatial extension, the at least two visual ranges may be flexibly and reliably adapted according to the desired requirements.

According to another advantageous refinement of the present invention, a control unit is provided for controlling the visual ranges of the at least one antenna of at least one of the radar sensors. The advantage achieved by this is that it is possible, when, for example, the radar system is installed in a vehicle, to simply and reliably adapt the visual ranges of the respective radar sensors to changing ambient conditions, for example, rain, etc. Thus, for example, it is possible using the control unit to increase the transmitting power of the antenna under poor weather conditions, and it is equally possible, for example, to correct specific errors during reception and in particular during processing of the radar beams which are beamed back from a preceding vehicle and received by the radar system.

According to another advantageous refinement of the present invention, the control unit is configured to adjust the visual range of at least one antenna of at least one radar sensor between +45 degrees, 0 degrees and −45 degrees relative to the main emission direction of the at least one radar sensor. This allows the visual range of the at least one antenna of the radar sensor to be pivoted in such a way that, in particular when the at least two radar sensors are each positioned at an angle between 40 degrees and 50 degrees, in each case a monitoring area totaling 90 degrees may be achieved as a result of the pivotal range of the visual range, thereby allowing both the side areas as well as the front or rear areas of a vehicle to be monitored.

According to another advantageous refinement of the present invention, at least one of the antennas of at least one of the radar sensors has visual ranges which are configured differently for different angles relative to the main emission direction of the respective radar sensor. In this way, the operating range of the radar system may be even better adapted to the respective requirements, since for different angles the visual ranges, for example, visual ranges in three-dimensional forms, may be variously configured.

According to another advantageous refinement of the present invention, at least one radar sensor includes a plurality of phased array antennas, whose respective visual range is pivotable with the aid of amplitude modulation and/or phase modulation. This ensures that the visual ranges of the antennas of the respective radar sensor may be pivoted in a simple and cost-effective manner.

According to another advantageous refinement of the motor vehicle, at least four radar sensors are positioned symmetrically to the left and right of the vehicle's longitudinal axis and in a front and rear area of the motor vehicle, the radar sensors being positioned each at an angle of 45 degrees relative to the longitudinal axis of the motor vehicle. This ensures that both the front and rear area of the motor vehicle may be monitored with the aid of the radar sensors, as well as the left and right side areas of the motor vehicle. In this way, essentially the entire traffic surroundings of the motor vehicle are monitored.

BRIEF DESCRIPTION OF THE DRAWING

FIG. 1 schematically shows in a top view a motor vehicle having a radar system according to one specific embodiment of the present invention.

DETAILED DESCRIPTION OF THE INVENTION

FIG. 1 denotes with reference numeral 1 a radar system according to one specific embodiment of the present invention, installed in a motor vehicle 2. Motor vehicle 2 includes a vehicle longitudinal axis 3, radar sensors 4a, 4b being positioned in a front area 3a of motor vehicle 2, each at an angle of 45 degrees, on the left and right side of the vehicle's longitudinal axis 3, and an additional radar sensor 4c, 4d being positioned in a rear area 3b of motor vehicle 2, each at an angle of essentially 45 degrees.

One of the four radar sensors 4a and its configuration is described below. The configuration of the other three radar sensors 4b, 4c, 4d corresponds essentially analogously to that of radar sensor 4a described.

As previously explained, radar sensor 4a is positioned at an angle 100 of essentially 45 degrees relative to vehicle longitudinal axis 3 of motor vehicle 2. In this configuration, main emission direction 52a is situated perpendicularly to the normal N of radar sensor 4a, and therefore also at an angle of 45 degrees relative to vehicle longitudinal axis 3 of motor vehicle 2. Visual range 52 of main emission direction 52a is essentially lobe-shaped. Radar sensor 4a may also be pivoted by +45 degrees in its main emission direction 52a about angle 101, so that emission direction 53a is oriented in parallel to vehicle longitudinal axis 3. The associated visual range 53 may be configured in such a way that, on the one hand, it also covers a portion of visual range 52 of main emission direction 52a. On the other hand, since the visual range is oriented parallel to vehicle longitudinal axis 3, its reach may be extended in order, in the case of preceding motor vehicles traveling at equally high speeds, to allow the surroundings of the right front area 3a of motor vehicle 2 to be reliably detected. Furthermore, it is also possible to pivot main emission direction 52a by −45 degrees about angle 101, so that emission direction 51a is aligned essentially perpendicularly to vehicle longitudinal axis 3 of motor vehicle 2. In such a case, the associated visual range 51 of emission direction 51a may be configured in such a way that it overlaps a portion of visual range 52 of main emission direction 52a. Additionally, visual range 51a may be configured as widely as possible, i.e., it may extend as far as possible in parallel to vehicle longitudinal axis 3. This allows for reliable detection of the immediate surroundings around motor vehicle 2. Similarly, visual range 51 may be configured in the form of a radar lobe 51, smaller in terms of its range away from motor vehicle 2 since, for example, on an expressway merely the respective adjacent lane must be monitored.

By and large, therefore, radar sensor 4a is installed in motor vehicle 2 at an angle 100 and essentially 45 degrees relative to vehicle longitudinal axis 3. Radar sensor 4a and the remaining radar sensors 4b, 4c, 4d may be configured in such a way that two or multiple visual ranges 51, 52, 53 may be configured simultaneously.

In summary, the present invention has the advantages, among other things, that with the radar system multiple functions, in particular blind spot assistance, lane change assistance and cross-traffic assistance, may be provided in a motor vehicle essentially simultaneously in a simple, economical and reliable manner, without having to significantly expand installation space.

The present invention, though described above with reference to preferred exemplary embodiments, is not limited thereto, but instead is modifiable in a variety of ways.

What is claimed is:

1. A radar system for a motor vehicle, comprising:
   at least two radar sensors each transmitting and receiving radar radiation for monitoring the surroundings of the motor vehicle;
   wherein the at least two radar sensors are each positioned, in a front area of the motor vehicle, at an angle between 40 degrees and 50 degrees, on a left side and a right side of a longitudinal axis of the motor vehicle, the at least two radar sensors each have at least one antenna, and wherein the at least two radar sensors are configured so that each respective antenna has a visual range of an angle between at least −60 degrees and +60 degrees relative to a main emission direction of the corresponding radar sensor,
   wherein each main emission direction is situated perpendicularly to a normal of each corresponding radar sensor and therefore also at the angle of between 40 degrees and 50 degrees relative to the longitudinal axis of the motor vehicle,
   wherein each of the radar sensors is pivotable in its main emission direction about the angle, so that an emission direction of the radar sensor is oriented in parallel to the vehicle longitudinal axis, so that a reach of the radar sensor is extendable to allow the surroundings of a right front area of the motor vehicle to be detected, and
   wherein one visual range is configured in the form of a first radar lobe for each of the radar sensors, wherein a second visual range is configured in the form of a second radar lobe for each of the radar sensors, wherein another visual range is configured in the form of a third radar lobe for each of the radar sensors, wherein the second visual range is associated with its associated main emission direction, wherein the one visual range of a first emission direction overlaps a portion of the second visual range associated with the main emission direction, and wherein the another visual range of a third emission direction overlaps a portion of the second visual range associated with the main emission direction.

2. The radar system as recited in claim 1, wherein at least four radar sensors are each positioned symmetrically relative to one other.

3. The radar system as recited in claim 1, wherein at least one of the radar sensors is configured to provide substantially simultaneously at least two visual ranges of the at least one antenna, the at least two visual ranges differing in directions.

4. The radar system as recited in claim 3, wherein a control unit is provided for controlling the visual ranges of the at least one antenna of the at least one of the radar sensors.

5. The radar system as recited in claim 4, wherein the control unit is configured to adjust the visual ranges of the at least one antenna of the at least one radar sensor between +45 degrees and −45 degrees relative to the main emission direction of the at least one radar sensor.

6. The radar system as recited in claim 1, wherein at least one antenna of at least one radar sensor has visual ranges which are configured differently for different angles relative to the main emission direction of the at least one radar sensor.

7. The radar system as recited in claim 6, wherein the at least one radar sensor includes a plurality of phased array antennas whose respective visual ranges are provided with the aid of at least one of amplitude modulation and phase modulation.

8. The radar system as recited in claim 2, wherein the at least four radar sensors are positioned symmetrically to the left side and the right side of the longitudinal axis of the motor vehicle and in a front area and a rear area of the motor vehicle, and wherein each of the at least four radar sensors are positioned at a respective angle of 45 degrees relative to the vehicle longitudinal axis.

9. A method of using a radar system in a motor vehicle for at least one of blind spot detection, lane change assistance, cross-traffic detection, and accident detection, the method comprising:
    providing at least two radar sensors each transmitting and receiving radar radiation for monitoring the surroundings of the motor vehicle;
    wherein the at least two radar sensors are each positioned, in a front area of the motor vehicle, at an angle between 40 degrees and 50 degrees, on a left side and a right side of a longitudinal axis of the motor vehicle, the at least two radar sensors each have at least one antenna, and wherein the at least two radar sensors are configured so that each respective antenna has a visual range of an angle between at least −60 degrees and +60 degrees relative to a main emission direction of the corresponding radar sensor,
    wherein each main emission direction is situated perpendicularly to a normal of each corresponding radar sensor and therefore also at the angle of between 40 degrees and 50 degrees relative to the longitudinal axis of the motor vehicle,
    wherein each of the radar sensors is pivotable in its main emission direction about the angle, so that an emission direction of the radar sensor is oriented in parallel to the vehicle longitudinal axis, so that a reach of the radar sensor is extendable to allow the surroundings of a right front area of the motor vehicle to be detected, and
    wherein one visual range is configured in the form of a first radar lobe for each of the radar sensors, wherein a second visual range is configured in the form of a second radar lobe for each of the radar sensors, wherein another visual range is configured in the form of a third radar lobe for each of the radar sensors, wherein the second visual range is associated with its associated main emission direction, wherein the one visual range of a first emission direction overlaps a portion of the second visual range associated with the main emission direction, and wherein the another visual range of a third emission direction overlaps a portion of the second visual range associated with the main emission direction.

10. A motor vehicle, comprising:
    a radar system for a motor vehicle, including at least two radar sensors each transmitting and receiving radar radiation for monitoring the surroundings of the motor vehicle;
    wherein the at least two radar sensors are each positioned, in a front area of the motor vehicle, at an angle between 40 degrees and 50 degrees, on a left side and a right side of a longitudinal axis of the motor vehicle, the at least two radar sensors each have at least one antenna, and wherein the at least two radar sensors are configured so that each respective antenna has a visual range of an angle between at least −60 degrees and +60 degrees relative to a main emission direction of the corresponding radar sensor,
    wherein each main emission direction is situated perpendicularly to a normal of each corresponding radar sensor and therefore also at the angle of between 40 degrees and 50 degrees relative to the longitudinal axis of the motor vehicle,
    wherein each of the radar sensors is pivotable by degrees in its main emission direction about the angle, so that an emission direction of the radar sensor is oriented in parallel to the vehicle longitudinal axis, so that a reach of the radar sensor is extendable to allow the surroundings of a right front area of the motor vehicle to be detected, and
    wherein one visual range is configured in the form of a first radar lobe for each of the radar sensors, wherein a second visual range is configured in the form of a second radar lobe for each of the radar sensors, wherein another visual range is configured in the form of a third radar lobe for each of the radar sensors, wherein the second visual range is associated with its associated main emission direction, wherein the one visual range of a first emission direction overlaps a portion of the second visual range associated with the main emission direction, and wherein the another visual range of a third emission direction overlaps a portion of the second visual range associated with the main emission direction.

* * * * *